Figure 1:
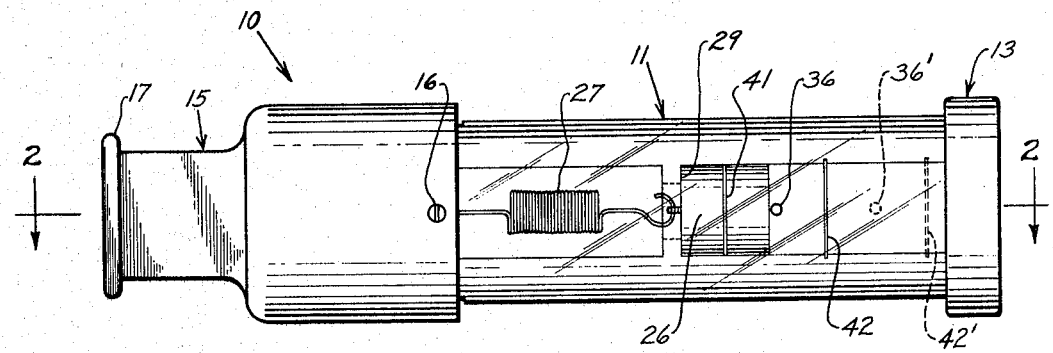

Jan. 17, 1967  M. W. LIPPITT, JR., ET AL  3,298,362
INSTRUMENT FOR USE IN PERFORMING A CONTROLLED VALSALVA MANEUVER
Filed Dec. 10, 1963

INVENTORS
Maxwell W. Lippitt, Jr.
John H. Reed, Jr.
BY
ATTORNEYS 3,298,362
INSTRUMENT FOR USE IN PERFORMING A
CONTROLLED VALSALVA MANEUVER
Maxwell W. Lippitt, Jr., Pasadena, Tex., and John H. Reed, Jr., Rochester, Minn., assignors to the United States of America, as represented by the Administrator of the National Aeronautics and Space Administration
Filed Dec. 10, 1963, Ser. No. 329,595
8 Claims. (Cl. 128—2.05)

The invention described herein may be manufactured and used by the Government of the United States of America for governmental purposes without the payment of any royalties thereon or therefor.

This invention relates generally to fluid pressure control devices, and more particularly to an instrument which is used for producing a known constant positive pressure within the lungs.

One of the clinical tests in evaluation of the cardiovascular system, known as the Flack test, requires the imposition of a known constant pressure within the lungs and thorax of the subject being tested. An intrathoracic pressure above the norm results in an impeded venous return to the heart with an increase in venous pressure in the extremities. It also results in a drop in arterial blood pressure with a concomitant rise in pulse rate. A sudden termination or release of this extra intra-thoracic pressure causes a sudden rise in venous return with a sharp decrease in the pulse rate and a concomitant increase in the amount of blood which is pumped into the systemic arterial tree. The manner of producing this rise and sudden release of intra-thoracic pressure is known clinically as the Valsalva maneuver and the responsive changes of pulse rate and blood pressure associated therewith are used in the Flack test as indicators for evaluating the cardiac control mechanism, determining the presence of some cardiac deformities, and determining the subject's level of orthostatic tolerance. The Flack test is one of the means employed for evaluating an astronaut's condition after being subjected to relatively long periods of limited activity and zero gravity conditions and can also be used during the existence of these conditions.

The Flack test has heretofore been accomplished by having the subject blow into a mercury manometer and maintain a pressure of 40 mm. of Hg by his own visual inspection of the manometer. The indicators of blood pressure and pulse rate are sampled before, during, and after the maneuver. However, a particular disadvantage in using the mercury manometer in the Flack test is that the subject can, and usually does, maintain the required pressure with the cheek muscles alone without using the thoracic muscles as is required. In addition, the manometer itself is of large size and fragile construction and is subject to spillage of liquid mercury. Furthermore, since it is dependent for operation upon the presence of a gravitational field, it cannot be used under zero gravity conditions.

To circumvent these disadvantages, the instrument of this invention is made of a hollow cylinder of transparent plastic which is fitted at one end with a mouthpiece and provided with a piston which is constrained by a spring attached at one end to the piston and by its other end to an adjustment screw provided on the mouthpiece. When pressure is applied to the cylinder by a person exhaling through the mouthpiece, the piston moves down the bore of the cylinder against the action of the spring by a distance which is proportional to the pressure applied. A small hole is drilled through the cylinder wall at a preselected distance from the mouthpiece whereby when the piston moves past the hole air flow from the cylinder to the outside occurs. The particular pressure at which this occurs is controlled by the tension in the spring. The subject who is using the instrument can therefore accurately develop a positive pressure within his lungs by exhaling with sufficient force to move the piston past the escape port and is able to maintain a constant positive pressure for a limited period by aligning and maintaining the alignment within his line of vision of a scribe mark on the piston with a scribe mark provided on the inner wall of the cylinder. Since air continually escapes while the subject is maintaining the pressure within the cylinder, he is required to use his thoracic muscles rather than his tongue or cheek muscles to sustain the desired pressure.

The instrument of this invention is small, rugged, and reliable and is independent of gravitational forces for its operation. The piston is made of an unwettable material to mitigate the effects of moisture which may condense in the cylinder and the inner surface of the cylinder is highly polished and coated with a fine silicone oil to reduce sliding friction between the piston and cylinder. A small normally closed port is provided in the pressure side of the cylinder for connecting an external pressure gauge which is used whenever it is desired to calibrate the instrument or to record the pressure. Any changes in the spring constant detected in a calibration of the instrument can be compensated by adjusting the tension on the piston contraining spring.

Figure 2:
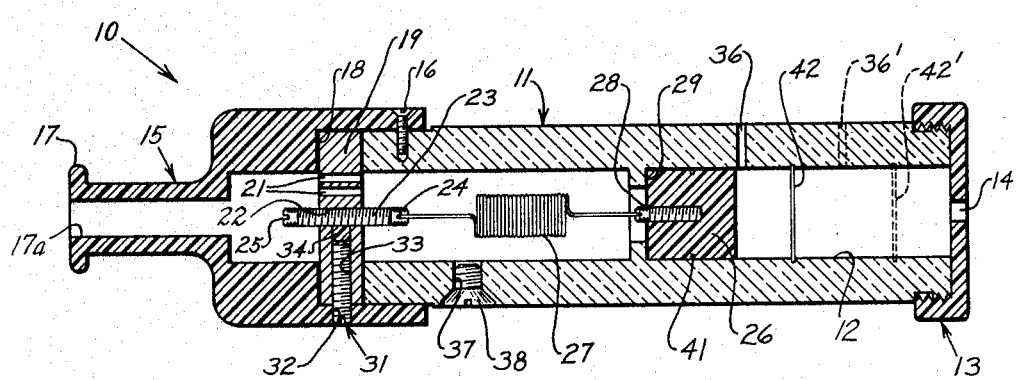

Other objects and many of the attendant advantages of this invention will be readily appreciated as the same become better understood by reference to the following detailed description when considered in connection with the accompanying drawing in which like reference numerals designate like parts throughout the figures thereof and wherein:

FIG. 1 is a top plan view of an instrument for use in establishing a known constant pressure in the lungs and which represents a preferred embodiment of the invention; and FIG. 2 is a sectional view of the instrument as taken along the line 2—2 in FIG. 1 and looking in the direction of the arrows.

Referring more particularly to the drawing, there is shown in FIGS. 1 and 2 an instrument 10 which is a preferred embodiment of the invention. The instrument 10 comprises a cylindrical tubular body 11 which is made of transparent material such as Plexiglas, or the like. The tube is provided with an internal bore 12 and is circular in transverse cross-section. At one end the tube is externally threaded and provided with a hard nylon cap 13 which is threadedly attached thereto. A small central opening 14 in the cap 13 provides an air passage therethrough.

At its other end, the Plexiglas cylinder is provided with a tubular mouthpiece 15, also of hard nylon, which is sleeved over the end portion of the cylinder and secured by a number of circumferentially spaced screws 16. The mouthpiece is formed with an annular flange 17 at one extremity so that it can be easily held by the teeth and lips and retained in the mouth when blowing therethrough. The bore or flow passage 17a through the mouthpiece extends axially therethrough and is enlarged to provide an internal annular shoulder 18 against which a disc 19 of corresponding diameter is seated. When the mouthpiece is attached to the cylinder the disc 19 is clamped against the end surface of the cylinder. The disc is of non-corrosive material, such as brass, or hard nylon, and is provided with a number of perforations 21 to provide communication between the mouthpiece and the bore of the cylinder. It is also provided with a small threaded bore 22 through its center in which a stainless steel screw 23 is threaded to extend on both sides of the disc. The end of the screw 23 which extends into the cylinder bore is provided with a small eye 24 to provide means for attaching thereto, and the other end of the screw is formed with a diametral slot 25 for receiving the end of a screw driver whenever it is desired to adjust the screw.

Snugly fitted within the Plexiglas cylinder is a Teflon piston or plunger 26 which is adapted for sliding movement within the cylinder and is anchored within the cylinder bore by means of a helically coiled spring 27 of nickel-plated music wire which has one end attached to the screw 23 in disc 19 and its other end to the eye of a stainless steel screw 28 which is threaded into the piston along the piston axis, as shown in FIG. 2. The coiled spring exerts a biasing force on the piston and urges the piston against the annular shoulder 29 formed in the cylinder bore intermediate the ends of the cylinder and at a location whereby the spring is adapted to hold the piston against the shoulder with little or no tension. Adjustment of the tension in the spring to a desired value is easily accomplished by turning the screw 23. After adjustment, screw 23 is clamped by means of a set screw 31 which is threaded through the bores 32 and 33 formed through the wall of the mouthpiece and the edge of the disc, respectively. Preferably, a small cylindrical piece 34 of hard nylon is inserted into the bore 33 before the set screw 31 to avoid damaging the threads of screw 23.

It will therefore to seen that when air is exhaled or blown into the cylinder through the mouthpiece, air pressure is applied against the piston to urge the piston away from the shoulder. When the air pressure exceeds the tension force in the spring which holds the piston against the shoulder, the piston moves away from the shoulder 29 until the air pressure is balanced by the increased tension in the spring. During the movement of the piston away from the shoulder, air in the cylinder to the right of the piston, as shown in FIG. 2, is exhausted through the opening in the cap 13.

An important feature of this invention is the provision of a port or aperture 36 through the side of the tube at a preselected location to the right of the shoulder 29, as shown in FIG. 2. Consequently, when a person blowing through the mouthpiece delivers sufficient pressure from his lungs to move the piston to a point past the port 36, air under pressure corresponding to the lung pressure exerted will escape from the cylinder through the port. Consequently, to maintain the position of the piston, air must be continuously supplied to the cylinder under a pressure which necessarily must be of an amount which equals the pulling force of the coiled spring exerted on the piston for this particular location of the piston. To prevent too rapid exhaustion of the gaseous content of the lungs, the port 36 is made small enough to permit an exhalation period which would provide for approximately 30 seconds of test and yet large enough to require the person using the instrument to use his thoracic muscles rather than his mouth to maintain required pressure.

In administering the Flack test as described above, it is desired that a thoracic pressure of 40 mm. of Hg be developed and maintained for substantially the entire period of an exhalation. In order that these conditions may be achieved by using the instrument 10, the instrument may be calibrated by using a standard pressure gauge connected in fluid communication with the bore of the cylinder through an opening 37 in the cylinder wall which is normally closed by the machine screw 38. By turning the adjustment screw 23, the tension applied by the coiled spring may be adjusted to determine the air pressure which must be applied against the piston for moving the piston just beyond the escape port 36. Since it is possible to force the piston a distance beyond the escape port 36 and thereby produce a greater exertion of lung power than is desired, a circumferential scribe mark 41 is made on the outer surface of the piston and is adapted to be aligned with a similar scribe mark 42 made on the inner wall of the cylinder. These scribe marks are so located that when they are brought into alignment within the line of vision of the person who is exhaling through the mouthpiece of the instrument, the piston will be located just to the right of the escape port 36 with the port unobstructed by the piston. A satisfactorily accurate control of lung pressure may be maintained in this manner. Hence, with the instrument properly calibrated, the person exhaling into the instrument and being clinically evaluated will develop and maintain a lung pressure and thoracic pressure corresponding to 40 mm. of Hg when he positions the piston past the port 36 with the scribe lines in coincidence as he sees them.

It is also obvious that an additional port 36' and other escape ports may be provided in the cylinder wall as indicated by the dashed lines in FIG. 2 of the drawing to permit attainment of higher pressure levels. The ports, of course, are longitudinally spaced along the cylinder and to facilitate positioning of the piston relative to a selected one of the escape ports an additional scribe line 42' for each additional port is provided on the inner wall of the cylinder. Because of the sharp rise in pressure which is required for a small movement of the piston past the escape port 36, an additional escape port in the cylinder wall for each additional pressure level permits more accurate alignment of the scribe lines and finer control of the pressure. Thus it will therefore be seen that a selected predetermined and constant fluid pressure may be maintained in the cylinder for a limited time and of a magnitude determined in accordance with whichever scribe line 42 the piston scribe line 41 is aligned.

When calibrating the instrument to determine or adjust the pressure required to move the piston past the escape port 36', the instrument may be calibrated with both escape ports uncovered. However, since this will generally result in an exhaustion of air from the lungs which is too rapid for the period required in which to administer a Flack test, the instrument is preferably calibrated with the port 36 closed. The instrument would then also be used in this manner—with the port 36 closed whenever it is desired to develop a pressure corresponding to a position of the piston just past the escape port 36'. A closure means for the port 36' may be provided in the form of a sliding ring sleeved over the cylinder, or other forms of closures might be used. Although it is not desirable, the port 36 could also be closed by merely using a finger.

To maintain the accuracy and reliability of the instrument, the inner surface of the cylinder over which the piston slides is highly polished and coated with a fine silicone oil which, in addition to reducing sliding friction, prevents mineral deposits in the moisture from adhering to the cylinder wall. Furthermore, since there is a tendency for moisture in the breath to condense and collect within the cylinder, the piston itself is made of an unwettable material, Teflon, and therefore does not swell nor otherwise show effects of moisture as would affect the low degree of sliding friction between the piston and cylinder.

It will therefore be seen that the instrument of this invention is particularly suited as a clinical tool for performing a "controlled Valsalva maneuver," as in the Flack test. By proper use of this invention a person may develop a known and constant positive pressure within the lungs which he may maintain for a limited period by exhaling into the instrument. Since there is continuous flow of air through the instrument when in use, the person being tested is required to continuously exhale and supply air to the instrument in order to maintain pressure.

It should be understood, of course, that the foregoing disclosure relates only to prefered embodiments of the invention and that it is intended to cover all changes and modifications of the examples in the invention herein chosen for the purpose of the disclosure which do not constitute departures from the spirit and scope of the invention.

What is claimed and desired to be secured by Letters Patent is:

1. In an instrument of the character described, a cylindrical tube having a bore extending therethrough and provided at one end with a mouthpiece whereby a person may blow through the mouthpiece into the tube;
   a piston slidably mounted within the tube in substantially airtight relation with the inner wall of the tube and movable in response to air pressure communicated to the tube through the mouthpiece;
   elastic means connecting the piston to said tube for yieldably holding the piston in a predetermined position within the tube, said elastic means being adapted to exert a tension force on the piston in counteraction to air pressure applied against the piston by a person exhaling through the mouthpiece into the tube to thereby limit the movement of the piston in accordance with the magnitude of the pressure, said tube having an opening in the side wall thereof at a distance from the mouthpiece which is greater than the distance of said predetermined position of the piston in the tube from said mouthpiece, whereby air delivered through the mouthpiece at a pressure sufficient to force the piston beyond said opening will escape from the tube and a continuous supply of air above a predetermined pressure must be delivered through the mouthpiece to maintain the position of the piston beyond said opening; and
   means for adjusting the magnitude of the tension force which is exerted by the elastic means on said piston in counteraction to a given magnitude of air pressure applied against the piston by a person exhaling through the mouthpiece.

2. An instrument for use in performing a controlled Valsalva maneuver, said instrument comprising:
   a tubular cylinder provided with an internal shoulder intermediate its respective ends;
   a mouthpiece having an air passage extending therethrough and attached at one end to one end of the cylinder with said air passage in fluid communication with the bore of the cylinder, said mouthpiece being provided at its free end with an external flange to facilitate the retention of the mouthpiece in the mouth by a person blowing therethrough;
   a cap having an aperture therethrough and fitted to the other end of the cylinder;
   a piston of non-wettable material fitted in the bore of said cylinder and adapted for sliding movement through said bore in response to fluid pressure communicated to the cylinder through said mouthpiece, said piston being limited in the direction of movement toward the mouthpiece end of the cylinder by said internal shoulder;
   a disc secured to the cylinder and extending transversely to the cylinder at its mouthpiece end, said disc being provided with a threaded bore extending through the center of the disc and at least one additional perforation;
   an adjustment screw threaded through the central bore of said disc;
   a coiled spring connected at one end to said piston and at its other end to said adjustment screw for yieldably holding the piston against said internal shoulder by means of the tension force in said spring and for constraining the movement of the piston when acted upon by fluid pressure communicated to the cylinder through the mouthpiece, said adjustment screw providing means for adjusting the tension force by which the spring constrains the movement of the piston when acted upon by a given fluid pressure in said cylinder, and said cylinder being provided with a port in the wall thereof which is intermediate said internal shoulder and the capped end of the cylinder whereby air is caused to flow from the cylinder through said port whenever the pressure communicated to the cylinder by a person exhaling through the mouthpiece is sufficient to drive the piston to a distance from said shoulder which exceeds the distance of said port from said shoulder.

3. An instrument for use in controlling the force by which a person exhales, said instrument comprising:
   a tubular cylinder provided with an internal shoulder intermediate its respective ends;
   a mouthpiece having an air passage extending therethrough and attached at one end to one end of the cylinder with said air passage in fluid communication with the bore of the cylinder;
   a piston fitted in the bore of said cylinder and adapted for sliding movement through said bore in response to fluid pressure communicated to the cylinder through said mouthpiece, said piston being limited in the direction of movement toward the mouthpiece end of the cylinder by said internal shoulder;
   an anchor member secured to the cylinder and extending transversely to the cylinder at its mouthpiece end, said anchor member being provided with a threaded bore extending therethrough in the longitudinal direction of the cylinder;
   an adjustment screw threaded through the bore of said anchor member;
   an elastic member connected to said piston and to said adjustment screw for yieldably holding the piston against said internal shoulder by means of the tension force in said elastic member and for constraining the movement of the piston when acted upon by fluid pressure communicated to the cylinder through the mouthpiece, said adjustment screw providing means for adjusting the tension force by which the elastic member constrains the movement of the piston when acted upon by a given fluid pressure in said cylinder and said cylinder being provided with a port in the wall thereof which is intermediate said internal shoulder and the end of the cylinder remote from the mouthpiece whereby air is caused to flow from the cylinder through said port whenever the pressure communicated to the cylinder by a person exhaling through the mouthpiece is sufficient to drive the piston to a distance from said shoulder which exceeds the distance of said port from said shoulder.

4. An instrument for use in controlling the force by which a person exhales, said instrument comprising:
   a tubular cylinder provided with an internal shoulder intermediate its respective ends;
   a mouthpiece attached to one end of the cylinder with the air passage through the mouthpiece in fluid communication with the bore of the cylinder;
   a piston fitted in the bore of said cylinder and adapted for sliding movement through the bore in response to fluid pressure communicated to the cylinder through the mouthpiece, said piston being limited in the direction of movement toward the mouthpiece end of the cylinder by said internal shoulder;
   an elastic member connected to said piston and said cylinder for yieldably holding the piston against said internal shoulder and for constraining the movement of the piston when acted upon by fluid pressure communicated to the cylinder through the mouthpiece, said cylinder being provided with a port in the wall thereof which is intermediate said internal shoulder and the end of the cylinder remote from the mouthpiece whereby air is caused to flow from the cylinder through said port whenever the pressure communicated to the cylinder by a person exhaling through the mouthpiece is sufficient to drive the piston a distance from said shoulder which exceeds the distance of said port;

and means for adjusting the tension force by which the elastic member constrains the movement of the piston when acted upon a by a given fluid pressure in said cylinder.

5. An instrument for use in controlling the force by which a person exhales, said instrument comprising:

a transparent tubular cylinder provided with an internal shoulder intermediate its respective ends;

a mouthpiece having an air passage extending therethrough and attached at one end to one end of the cylinder with said air passage in fluid communication with the bore of the cylinder;

a piston fitted in the bore of said cylinder and adapted for sliding movement through said bore in response to fluid pressure communicated to the cylinder through said mouthpiece, said piston being limited in the direction of movement toward the mouthpiece end of the cylinder by said internal shoulder;

an anchor member secured to the cylinder and extending transversely to the cylinder at its mouthpiece end, said anchor member being provided with a threaded bore extending therethrough in substantially the longitudinal direction of the cylinder;

an adjustment screw threaded through the bore of said anchor member; and an elastic member connected to said piston and to said adjustment screw for yieldably holding the piston against said internal shoulder by means of the tension force in said elastic member and for constraining the movement of the piston when acted upon by fluid pressure communicated to the cylinder through the mouthpiece, said adjustment screw providing means for adjusting the tension force by which the elastic member constrains the movement of the piston when acted upon by a given fluid pressure in said cylinder, and said cylinder being provided with a port in the wall thereof which is intermediate said internal shoulder and the end of the cylinder remote from the mouthpiece whereby air is caused to flow from the cylinder through said port whenever the pressure communicated to the cylinder by a person exhaling through the mouthpiece is sufficient to drive the piston a distance from said shoulder which exceeds the distance of said port from said shoulder.

6. An instrument for use in maintaining a constant lung pressure during exhalation, said instrument comprising:

a tubular cylinder having an inlet end and provided with an internal shoulder intermediate its respective ends;

a piston fitted in the bore of said cylinder and adapted for sliding movement through said bore in response to fluid pressure communicated to the cylinder through said inlet, said piston being limited in the direction of movement toward the inlet of the cylinder by said internal shoulder;

an anchor member secured to the cylinder adjacent its inlet end, said anchor member being provided with a threaded bore extending therethorugh in the axial direction of said cylinder;

an adjustment screw threaded through the bore of said anchor member; and an elastic member connected to said piston and to said adjustment screw for yieldably holding the piston against said internal shoulder by means of tension force in the elastic member and for constraining the movement of the piston when acted upon by fluid pressure communicated to the cylinder through said inlet, said adjustment screw providing means for adjusting the tension force by which the elastic member holds the piston against said shoulder, and said cylinder having a port in the side wall thereof at a preselected distance from the inlet end which is greater than the distance of the internal shoulder from the inlet end.

7. An instrument for use in maintaining a continuous intrapulmonic and intrathoracic constant pressure during exhalation, said instrument comprising:

a tubular cylinder provided with an internal shoulder intermediate its respective ends;

a mouthpiece having an air passage extending therethrough and attached at one end to one end of the cylinder with said air passage in fluid communication with the bore of the cylinder;

a piston fitted in the bore of said cylinder and adapted for sliding movement through said bore in response to fluid pressure communicated to the cylinder through said mouthpiece, said piston being limited in the direction of movement toward the mouthpiece end of the cylinder by said internal shoulder;

an anchor member secured to the cylinder and extending transversely to the cylinder at its mouthpiece end, said anchor member being provided with a threaded bore extending therethrough in substantially the axial direction of said cylinder;

an adjustment screw threaded through the bore of said anchor member; and an elastic member connected to said piston and to said adjustment screw for yieldably holding the piston against said internal shoulder and for constraining the movement of the piston when acted upon by fluid pressure communicated to the cylinder through the mouthpiece, said adjustment screw providing means for adjusing the tension force by which the elastic member holds the piston against said shoulder.

8. An instrument for use in maintaining a continuous constant lung pressure during exhalation, said instrument comprising:

a transparent tubular cylinder provided with an internal shoulder intermediate its respective ends;

a mouthpiece having an air passage extending therethrough and attached at one end to one end of the cylinder with said air passage in fluid communication with the bore of the cyclinder; a piston fitted in the bore of said cylinder and adapted for sliding movement through said bore in response to air pressure communicated to the cylinder through said mouthpiece, said piston being limited in the direction of movement toward the mouthpiece end of the cylinder by said internal shoulder;

an anchor member secured to the cylinder and extending transversely to the cylinder at its mouthpiece end, said anchor member being provided with a threaded bore extending therethrough in substantially the axial direction of the cylinder;

an adjustment screw threaded through the bore of said anchor member;

an elastic member connected to said piston and to said adjustment screw for yieldably holding the piston against said internal shoulder by means of the tension force in said elastic member and for constraining the movement of the piston when acted upon by fluid pressure communicated to the cylinder through the mouthpiece, said adjustment screw providing means for adjusting the tension force by which the elastic member holds the piston against said shoulder; and indicia on said piston and cylinder for indicating the position of the piston within the tube and the air pressure acting on said piston.

(References on following page)

References Cited by the Examiner

UNITED STATES PATENTS

| | | | |
|---|---|---|---|
| 793,177 | 6/1905 | Cady | 128—2.08 |
| 820,543 | 5/1906 | Bartezki | 128—2.08 |
| 2,098,280 | 11/1937 | Dornseif | 128—2.08 |

FOREIGN PATENTS 126,610  7/1945  Sweden.

References Cited by the Applicant

UNITED STATES PATENTS

| | | |
|---|---|---|
| 471,389 | 3/1892 | Lacey. |
| 793,177 | 6/1905 | Cady. |
| 895,606 | 8/1908 | Warde. |

RICHARD A. GAUDET, *Primary Examiner.*

SIMON BRODER, *Examiner.*